(12) United States Patent
Otto

(10) Patent No.: US 10,023,386 B2
(45) Date of Patent: Jul. 17, 2018

(54) CONVEYOR FOR CONVEYING SUSPENDED OBJECTS

(71) Applicant: Dematic GmbH, Heusenstamm (DE)

(72) Inventor: Thomas Otto, Bielefeld (DE)

(73) Assignee: Dematic GmbH, Heusenstamm (DE)

( * ) Notice: Subject to any disclaimer, the term of this patent is extended or adjusted under 35 U.S.C. 154(b) by 0 days.

(21) Appl. No.: 15/472,405

(22) Filed: Mar. 29, 2017

(65) Prior Publication Data

US 2017/0283172 A1  Oct. 5, 2017

(30) Foreign Application Priority Data

Mar. 29, 2016  (DE) ........................ 10 2016 105 715

(51) Int. Cl.
  *B65G 17/32* (2006.01)
  *B65G 9/00* (2006.01)

(52) U.S. Cl.
  CPC ........ *B65G 9/008* (2013.01); *B65G 2812/188* (2013.01)

(58) Field of Classification Search
  USPC .... 198/678.01, 680, 682, 684, 465.4, 369.1, 198/369.2, 370.01; 414/331.01, 331.15
  See application file for complete search history.

(56) References Cited

U.S. PATENT DOCUMENTS

| | | |
|---|---|---|
| 3,196,804 A | 7/1965 | Harrison |
| 3,343,498 A | 9/1967 | Klamp |
| 3,839,966 A | 10/1974 | Tunison |
| 5,048,426 A * | 9/1991 | Burt ........................ B61B 10/02 104/88.01 |
| 5,224,919 A * | 7/1993 | Walsh .................... B31B 50/00 493/110 |
| 5,768,998 A | 6/1998 | Enderlein |

(Continued)

FOREIGN PATENT DOCUMENTS

| | | |
|---|---|---|
| DE | 29709547 U1 | 8/1997 |
| DE | 20103664 U1 | 6/2001 |

(Continued)

OTHER PUBLICATIONS

Commonly assigned co-pending U.S. Appl. No. 15/472,407, filed Mar. 29, 2017, entitled Conveyor for Conveying Suspended Objects.

*Primary Examiner* — Gene O Crawford
*Assistant Examiner* — Lester III Rushin
(74) *Attorney, Agent, or Firm* — Gardner, Linn, Burkhart & Ondersma LLP

(57) ABSTRACT

A conveyor for suspended objects includes a first rail profile having a first upper track and a second track arranged below the first track, a conveyor chain that can be moved continuously in a direction of conveyance in the first track. The conveyor includes holding adapters for holding objects to be conveyed, with each holding adapter having a head part that is mounted so as to roll in the second track and is coupled to the conveyor chain. A sorting portion having a switch that follows in the direction of conveyance and via which the holding adapters can be transferred from the first rail profile to a second rail profile. The switch includes an overdrive and a drive belt, with the overdrive configured such that during operation the running speed of the drive belt is higher than the running speed of the conveyor chain.

13 Claims, 4 Drawing Sheets

(56) References Cited

U.S. PATENT DOCUMENTS

| | | |
|---|---|---|
| 6,234,290 B1 | 5/2001 | Drexl et al. |
| 6,298,969 B1 | 10/2001 | Otto |
| 6,540,057 B2 | 4/2003 | Konrad et al. |
| 6,540,058 B2 | 4/2003 | Drexl et al. |
| 6,588,558 B2 | 7/2003 | Otto et al. |
| 6,622,836 B2 | 9/2003 | Otto et al. |
| 6,688,445 B2 | 2/2004 | Otto |
| 6,698,575 B2 | 3/2004 | Gartner |
| 6,786,323 B2 | 9/2004 | Schonenberger |
| 8,490,774 B2 | 7/2013 | Janzen |
| 8,561,787 B2 | 10/2013 | Wend et al. |
| 8,607,963 B2 | 12/2013 | Wend et al. |
| 8,672,118 B2 | 3/2014 | Janzen et al. |
| 9,027,734 B2 | 5/2015 | Wend et al. |
| 9,056,722 B2 | 6/2015 | Otto |
| 9,205,990 B2 | 12/2015 | Otto |
| 9,205,992 B2 | 12/2015 | Otto |
| 9,296,561 B2 | 3/2016 | Wend et al. |
| 9,440,791 B2 | 9/2016 | Wend |
| 9,475,656 B2 | 10/2016 | Sieksmeier et al. |
| 9,573,773 B2 | 2/2017 | Otto |
| 2015/0239671 A1 | 8/2015 | Wend |

FOREIGN PATENT DOCUMENTS

| | | |
|---|---|---|
| DE | 10012524 A1 | 9/2001 |
| DE | 102004018569 A1 | 11/2005 |
| DE | 102005006067 A1 | 8/2006 |
| DE | 102006007936 A1 | 8/2007 |
| DE | 102010053426 B3 | 6/2012 |
| EP | 0336714 A2 | 10/1989 |
| EP | 0416337 A1 | 3/1991 |
| EP | 1258439 A1 | 11/2002 |
| EP | 1420106 A1 | 5/2004 |
| EP | 1690811 A1 | 8/2006 |
| EP | 2196415 B1 | 1/2013 |
| EP | 2818434 A1 | 12/2014 |
| EP | 2886494 A1 | 6/2015 |
| EP | 2910499 A1 | 8/2015 |
| EP | 2789555 B1 | 6/2016 |
| GB | 2243816 A | 11/1991 |
| JP | S6077011 A | 5/1985 |
| JP | H08151111 A | 6/1996 |
| WO | 0147791 A2 | 7/2001 |

\* cited by examiner

US 10,023,386 B2

CONVEYOR FOR CONVEYING SUSPENDED OBJECTS

CROSS REFERENCE TO RELATED APPLICATION

The present application claims priority of German patent application Ser. No. DE102016105715.0, filed Mar. 29, 2016.

BACKGROUND AND FIELD OF THE INVENTION

The present invention relates to a conveyor for conveying suspended objects.

Conveyors of the generic type which are used for conveying suspended objects, such as items of clothing, bags and the like, consist substantially of rail profiles, in which in an upper track a conveyor chain is guided, which are coupled to holding adapters guided in a lower track of the rail profiles and are entrained by the conveyor chain in a direction of conveyance.

In order to transfer individual holding adapters from a first conveyor circuit, which is formed by such a rail profile, to a second rail profile, the rail profiles are connected to one another by means of so-called switches.

In the case of bags or items of clothing, such as jackets, T-shirts and the like which have a specific width perpendicular to the direction of conveyance, the objects can be struck during transport via the switch by subsequent objects being conveyed further along the rail profile, thereby causing oscillations or rotations that can cause disruptions in the further transport such that the conveyor chain must be stopped.

The further transport of the objects to be conveyed in the switches is typically effected via separate drive apparatuses comprising motors which drive a conveyor chain or the like which is allocated to the switch and which for its part conveys the objects to be conveyed along the switch.

The activation of the conveyor chain of the switch must be coupled to the activation of the conveyor chain of the first rail profile in order to ensure that the objects which are transported off via the switch and are suspended from the holding adapters are transported away at sufficient speed from the first rail profile in order to prevent objects transported further along the first rail profile from being struck by those objects which are transported off via the switch.

SUMMARY OF THE INVENTION

The object of the present invention is to provide a conveyor whereby suspended objects are prevented from colliding in the manner described above in a simple and cost-effective manner.

In accordance with an embodiment of the present invention, a conveyor for conveying suspended objects has a first rail profile having a first upper track and a second track arranged below the first track. The conveyor also has a conveyor chain which can be driven by friction rollers and can be moved continuously in a direction of conveyance in the first track of the rail profile. Furthermore, the conveyor has holding adapters for holding objects to be conveyed, each having a head part which is mounted so as to be able to roll in the second track of the rail profile and is coupled to the conveyor chain. The conveyor further comprises at least one sorting portion having a switch which follows in the direction of conveyance, where the holding adapters may be transferred from the first rail profile to a second rail profile via the switch.

The switch further includes an overdrive and a drive belt, with the overdrive configured such that during operation the running speed of the drive belt is higher than the running speed of the conveyor chain, whereby the switch may not require a dedicated drive. Moreover, configuring the overdrive whereby during operation the running speed of the drive belt is higher than the running speed of the conveyor chain also enables in a simple manner that the objects which are to be conveyed and are transported off via the switch move more rapidly than objects which remain in the first rail profile and are transported past the switch and therefore such objects are easily and effectively prevented from colliding.

According to a particular embodiment, the overdrive has a drive roller, which is coupled to the conveyor chain arranged in the first rail profile, and a transfer roller which is coupled to the drive roller via a coupling element and drives the drive belt. By coupling the drive roller to the conveyor chain in the first rail profile, objects transported off via the switch are transported at a higher speed than the running speed of the conveyor chain, even during operation of the conveyor chain at varying speed.

Still further, a first transmission roller is mounted on a first rotary spindle of the drive roller for conjoint rotation with the first rotary spindle, the first transmission roller being coupled via the coupling element to a second transmission roller mounted on a second rotary spindle for conjoint rotation therewith, whereby the transfer roller coupled to the drive belt is mounted on the second rotary spindle for conjoint rotation with the rotary spindle. The coupling element may be designed as a belt in accordance with a particular aspect of the invention.

The use of such transmission rollers renders it possible, depending upon the weight or size of the objects to be conveyed, to adapt the conveyor accordingly such that the differential speed between the conveyor chain and the drive belt can be configured accordingly.

According to yet another embodiment, in order to convey the holding adapters further in the direction of conveyance in the switch, elevations which protrude perpendicularly with respect to the direction of conveyance are formed on an outer surface of the drive belt. In particular embodiments, these elevations are designed as elastically bendable fingers, thus enabling the holding adapters to be transported easily and reliably. Moreover, such a drive belt can be produced in a simple and cost-effective manner.

DESCRIPTION OF THE PREFERRED EMBODIMENTS

In the following description of the figures, terms such as top, bottom, left, right, front, rear, etc. relate exclusively to the example representation and position, selected in the figures, of the conveyor, the rail profiles, the track, the conveyor chain, the switch, the overdrive and the like. These terms are not to be understood as limiting, i.e. these references can change by virtue of different operating positions or the mirror-symmetrical configuration or the like.

Figure 1:
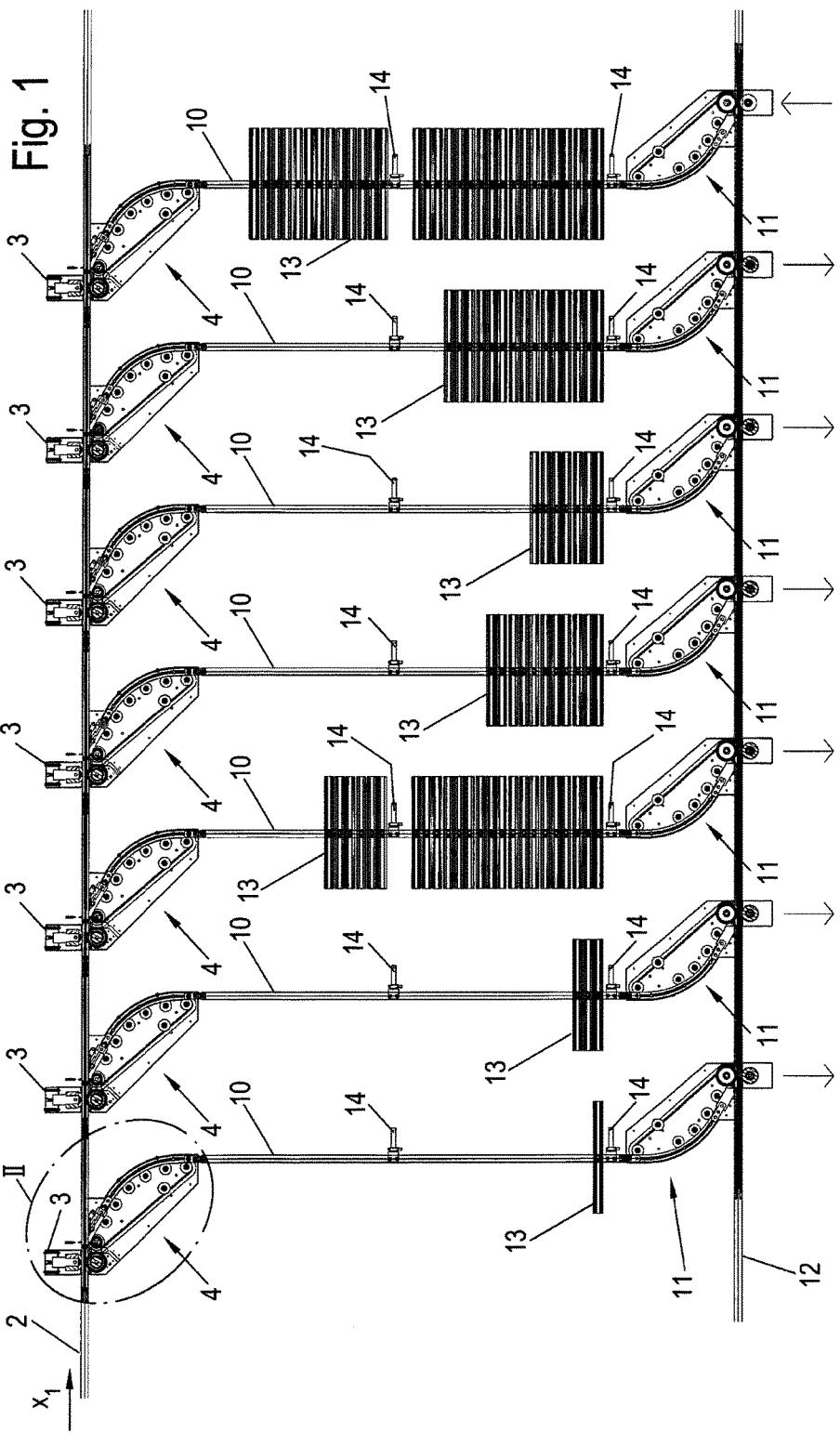
FIG. 1 shows a schematic plan view of one embodiment variant of a conveyor in accordance with the invention comprising a plurality of switches connected in series along the first rail profile.

FIG. 1 shows by way of example a detail of a conveyor for conveying suspended objects. The conveyor has a circumferential first rail profile 2 which is operated as a so-called sorter, wherein the objects 13 to be conveyed are conveyed along the first rail profile 2 in a direction of conveyance x. At a passing point (not illustrated), the objects 13 to be conveyed are passed to the first rail profile 2.

At one or a plurality of positions of the first rail profile 2, switches 4 are arranged along the first rail profile 2, at which the objects to be conveyed are identified with the aid of an identification unit and after being identified are either transported further along the first rail profile 2 or, by adjusting the switch 4, are transferred via the respective switch 4 from the first rail profile 2 to a second rail profile 10 and are transported further along the second rail profile 10.

In the case of the variant of the conveyor shown in FIG. 1, the second rail profiles 10 serve as a temporary intermediate storage area in which the objects 13 to be conveyed are occasionally stored intermediately.

The objects 13 to be conveyed which are stored on the second rail profile 10 are further transported, in the next stage, via further switches 11 to a third rail profile 12. This further transport is controlled preferably via stopping devices 14, via which the objects 13 to be conveyed are further transported via the switches 11 to the third rail profile 12 in an electronically controlled manner. The third rail profile 12 is designed preferably as a so-called discharge conveyor.

Figure 2:
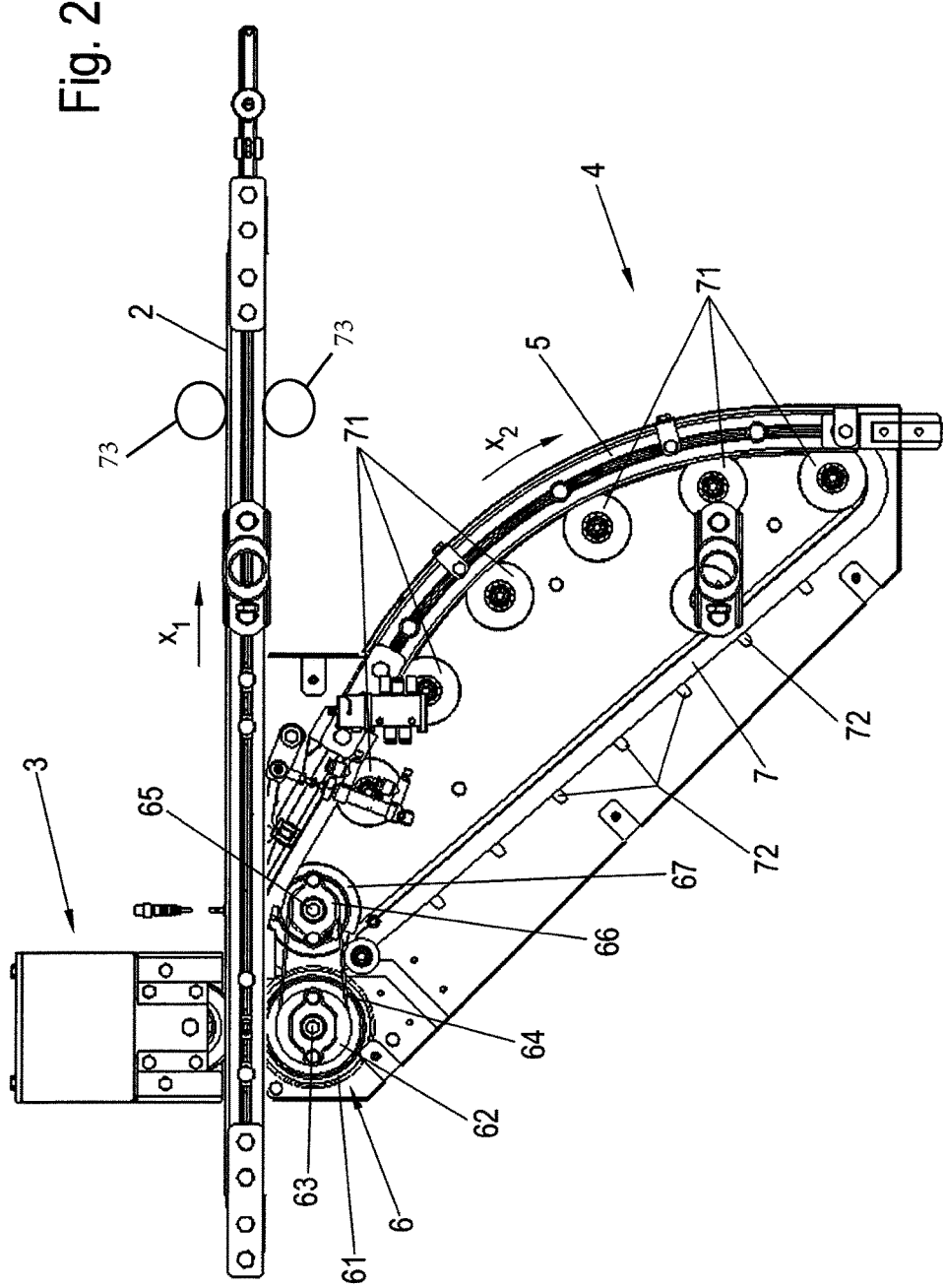
FIG. 2 shows a schematic plan view of a detail, designated by the reference sign II in FIG. 1, of an embodiment variant of a conveyor in accordance with the invention illustrating a first rail profile and a switch.

In order to facilitate a smooth transition of the objects 13, to be conveyed, from the first rail profile 2 via the respective switch 4 to the second rail profile 10, during operation the running speed of a drive belt 7 of the switch 4 is higher than the running speed of a conveyor chain 9 of the first rail profile 2. Such a switch 4 and the interface thereof with the first rail profile 2 is shown in FIGS. 2-4.

Figure 3:
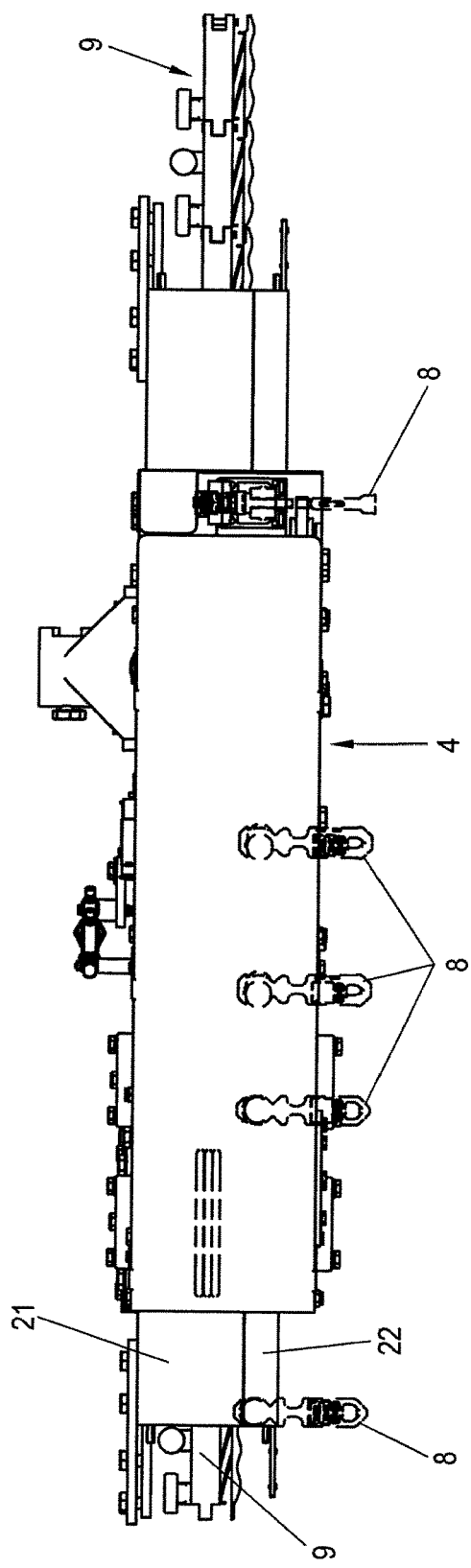
FIG. 3 shows a side view of the conveyor shown in FIG. 2.
Figure 4:
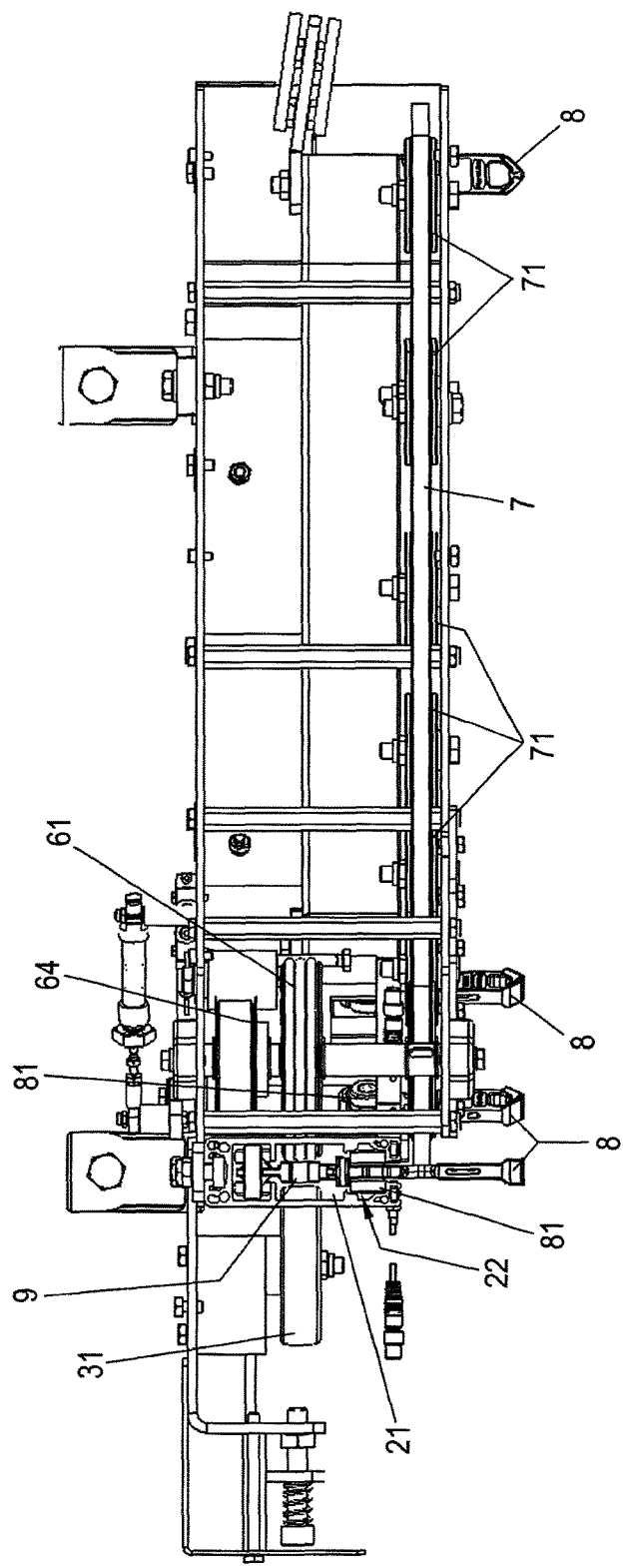
FIG. 4 shows a further side view of the conveyor of FIG. 2 with the cover plate of the switch omitted in order to illustrate an overdrive.

As shown in FIGS. 3 and 4, the first rail profile 2 has a first upper track 21 and a second track 22 arranged below the first track 21. The conveyor chain 9 of the first rail profile 2 can be moved continuously in a direction of conveyance x in the first track 21 of the rail profile 2. The conveyor chain 9 can be driven with the aid of friction rollers 73 arranged along the rail profile 2. Head parts 81, which are mounted so as to be able to roll, of respective holding adapters 8 are guided in the second track 22 and serve to hold the objects 13 to be conveyed. The head part 81 of the holding adapters 8 is coupled to the conveyor chain 9, as can be seen e.g. in FIGS. 3 and 4.

Furthermore, the conveyor has at least one sorting portion having a switch 4 which follows in the direction of conveyance $x_1$ and via which the holding adapters 8 can be transferred from the first rail profile 2 to a second rail profile 10. In one embodiment variant, this sorting portion includes a reading device which can read out information relating to the object 13 to be conveyed, said information being contained preferably at the respective holding adapter 8.

Alternatively, the information relating to the object 13 which is to be conveyed and is attached to the respective holding adapter 8 is read-in as the holding adapter 8 and therefore the object 13 which is to be conveyed and is attached thereto are being passed to the first rail profile 2. As the respective holding adapter 8 is conveyed further along the first rail profile 2, the procedure of controlling at which one of the switches 4 arranged one behind the other along the first rail profile 2 the holding adapter 8 is to be transferred out is effected by the counting of clock pulses. One clock pulse corresponds preferably to a defined path section of the first rail profile 2. The removal from the point where the object 13 is passed to the first rail profile 2 at the respective switches 4 can be determined by reference to clock pulses. As a result, the control of the outward transfer procedure via a predetermined switch 4 is independent of the running speed of the conveyor chain 9 of the first rail profile 2.

In a particular embodiment variant, in order to even more precisely activate the switching point of a respective control element of the switch 4, which determines the further path of the holding adapter 8, either further along the first rail profile 2 or from the first rail profile 2, a sensor, preferably a light sensor is arranged, in a region of the first rail profile 2 upstream of the control element of the respective switch 4, on the first rail profile 2 or on a housing of the switch 4, with which the arrival of a holding adapter 8 can be established. Therefore, the switching time of the switch 4 can be established even more precisely even in the case of longer conveyance sections, in which by reason of possible length extensions of the conveyor chain 9 the clock pulses do not correspond exactly to the section travelled by the holding adapter from the passing point to the respective switch 4.

If, from the information thus read-in, it is apparent that the object 13 to be conveyed is to be conveyed from the first rail profile 2 via the switch 4, a control element of the switch 4 is correspondingly adjusted so that during the further transport the holding adapter 8 is transferred to a rail profile 5 of the switch 4. The switch 4 has substantially the aforementioned control element, not illustrated here, and a rail profile 5 in which the head part 81 of the respective holding adapter 8 is guided.

Furthermore, in order to convey the holding adapters 8 and the objects 13 suspended therefrom, the switch 4 is provided with a drive belt 7. The drive belt 7 is in contact with the respective holding adapters 8 and moves them along the rail profile 5 towards the second rail profile 10.

As can be seen in FIG. 2, for the further conveyance of the holding adapters 8, the drive belt 7 in the illustrated embodiment has on an outer surface of the drive belt 7, elevations 72 which protrude perpendicularly with respect to the direction of conveyance $x_2$. Moreover, in a particular embodiment, the elevations 72 are configured as elastically bendable fingers.

Bearing rollers 71 are provided at predetermined spaced intervals and are in contact with and tension the inner surface of the drive belt 7 to guide the drive belt 7. Moreover, in the illustrated embodiment, the drive belt 7 is not driven by a separate motor-driven drive roller but instead can be driven by an overdrive 6. This overdrive 6 has a drive roller 61, which is coupled to the conveyor chain 9 arranged in the first rail profile 2, and a transfer roller 67 which is coupled to said drive roller via a coupling element 64 and drives the drive belt 7. As a result, the drive belt 7 of the switch 4 is driven by the conveyor chain 9 running in the first rail profile 2 and therefore is driven by the drive rollers 31 which drive the conveyor chain 9.

The overdrive 6 is designed and configured such that the running speed of the drive belt 7 of the switch 4 is higher than the running speed of the conveyor chain 9. As understood by a combination of FIGS. 2 and 4, a first transmission roller 62 is mounted on a first rotary spindle 63 of the drive roller 61 for conjoint rotation with the first rotary spindle 63.

The first transmission roller 62 is coupled to a second transmission roller 66, which is mounted on a second rotary spindle 65 for conjoint rotation therewith, via a coupling element 64 which is designed preferably as a belt. The transfer roller 67 is mounted for conjoint rotation with the rotary spindle 65 and is coupled to the drive belt 7. The first rotary spindle 63 and the second rotary spindle 65 are mounted so as to be able to rotate with respect to a housing of the switch 4. In an alternative embodiment, it would be feasible, for example, to use a transmission gear unit comprising gearwheels instead of the coupling element 64 designed as a belt.

As illustrated in FIG. 2, the drive unit 3 for driving the conveyor chain 9 in the illustrated embodiment is arranged directly opposite the drive roller 61 of the overdrive 6 coupled to the conveyor chain 9. The drive unit 3 consists substantially of a motor and a drive roller 31 (shown in FIG. 4).

The rail profile 5 of the switch 4 is formed substantially in the shape of a circular arc so that the objects 13 which are suspended from respective adapters 8 and are to be conveyed are transported away from the first rail profile 2 at an angle thereto. The transmission of the overdrive 6 is further configured in such a manner that the speed of the drive belt 7 of the switch 4 is between 120 and 200% of the speed of the conveyor chain 9. This effectively prevents an object 13 which is to be conveyed and is transported off via the switch 4 from colliding with a subsequent object 13 which is to be conveyed and is transported further along the first rail profile 2, and prevents the object from performing an undesired rotational movement.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A conveyor for conveying suspended objects, said conveyor comprising:
    a first rail profile having a first upper track and a second track arranged below the first track;
    a conveyor chain configured to be moved continuously in a direction of conveyance in the first track of the rail profile;
    holding adapters for holding objects to be conveyed, each having a head part which is mounted so as to be able to roll in the second track of the rail profile and is coupled to the conveyor chain;
    at least one sorting portion having a switch which follows in the direction of conveyance and via which the holding adapters can be transferred from the first rail profile to a second rail profile; and
    wherein the switch has an overdrive and a drive belt, and wherein the overdrive is configured such that during operation the running speed of the drive belt is higher than the running speed of the conveyor chain, wherein the overdrive has a drive roller and a transfer roller, wherein the drive roller is coupled to the conveyor chain arranged in the first rail profile, and the transfer roller is coupled to said drive roller via a coupling element and drives the drive belt.

2. The conveyor as claimed in claim 1, wherein a first transmission roller is mounted on a first rotary spindle of the drive roller for conjoint rotation with the first rotary spindle, said first transmission roller being coupled via the coupling element to a second transmission roller mounted on a second rotary spindle for conjoint rotation therewith, wherein the transfer roller coupled to the drive belt is mounted on the second rotary spindle for conjoint rotation with the rotary spindle.

3. The conveyor as claimed in claim 2, wherein the coupling element is designed as a belt.

4. The conveyor as claimed in claim 3, wherein elevations which protrude perpendicularly with respect to the direction of conveyance are formed on an outer surface of the drive belt in order to convey the holding adapters further in the direction of conveyance.

5. The conveyor as claimed in claim 4, wherein the elevations are designed as elastically bendable fingers.

6. The conveyor as claimed in claim 1, wherein the coupling element is designed as a belt.

7. The conveyor as claimed in claim 1, wherein elevations which protrude perpendicularly with respect to the direction of conveyance are formed on an outer surface of the drive belt in order to convey the holding adapters further in the direction of conveyance.

8. The conveyor as claimed in claim 7, wherein the elevations are designed as elastically bendable fingers.

9. A conveyor for conveying suspended objects, comprising:
    a first rail profile having a first upper track and a second track arranged below the first track;
    a conveyor chain which can be driven by friction rollers and can be moved continuously in a direction of conveyance in the first track of the rail profile;
    holding adapters for holding objects to be conveyed, each having a head part which is mounted so as to be able to roll in the second track of the rail profile and is coupled to the conveyor chain;
    at least one sorting portion having a switch which follows in the direction of conveyance and via which the holding adapters can be transferred from the first rail profile to a second rail profile; and
    wherein the switch has an overdrive and a drive belt, and wherein the overdrive is configured such that during operation the running speed of the drive belt is higher than the running speed of the conveyor chain, and wherein elevations which protrude perpendicularly with respect to the direction of conveyance are formed on an outer surface of the drive belt in order to convey the holding adapters further in the direction of conveyance.

10. The conveyor as claimed in claim 9, wherein the overdrive has a drive roller and a transfer roller, wherein the drive roller is coupled to the conveyor chain arranged in the first rail profile, and the transfer roller is coupled to said drive roller via a coupling element and drives the drive belt.

11. The conveyor as claimed in claim 10, wherein a first transmission roller is mounted on a first rotary spindle of the drive roller for conjoint rotation with the first rotary spindle, said first transmission roller being coupled via the coupling element to a second transmission roller mounted on a second rotary spindle for conjoint rotation therewith, wherein the transfer roller coupled to the drive belt is mounted on the second rotary spindle for conjoint rotation with the rotary spindle.

12. The conveyor as claimed in claim 10, wherein the elevations are designed as elastically bendable fingers.

13. The conveyor as claimed in claim 12, wherein the coupling element is designed as a belt.

* * * * *